United States Patent
Schulten et al.

(10) Patent No.: US 10,893,588 B2
(45) Date of Patent: Jan. 12, 2021

(54) METHOD OF OPERATING A LIGHTING DEVICE

(71) Applicant: OSRAM Opto Semiconductors GmbH, Regensburg (DE)

(72) Inventors: Dominik Schulten, Regensburg (DE); Michael Schumann, Neu-Ulm (DE); Dominik Scholz, Bad Abbach (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 16/484,232

(22) PCT Filed: Feb. 22, 2018

(86) PCT No.: PCT/EP2018/054390
§ 371 (c)(1),
(2) Date: Aug. 7, 2019

(87) PCT Pub. No.: WO2018/153989
PCT Pub. Date: Aug. 30, 2018

(65) Prior Publication Data
US 2020/0037407 A1  Jan. 30, 2020

(30) Foreign Application Priority Data
Feb. 24, 2017 (DE) .......... 10 2017 103 891

(51) Int. Cl.
*H05B 45/20* (2020.01)
*G09G 5/02* (2006.01)
(Continued)

(52) U.S. Cl.
CPC .......... *H05B 45/20* (2020.01); *H05B 45/24* (2020.01)

(58) Field of Classification Search
CPC ... G06T 15/005; G06T 3/4007; G06T 11/203; G06T 15/83; G06T 15/87; G06T 11/40; G06T 11/001; G06T 15/503; G06T 2200/12; G09G 5/363; G09G 2340/125; G09G 2340/0457; G09G 5/28; G09G 2300/0452; G09G 3/2003; G09G 3/3688; G09G 3/3648; G09G 2330/021;
(Continued)

(56) References Cited

U.S. PATENT DOCUMENTS

| 9,651,632 | B1 | 5/2017 | Knapp et al. |
| 2004/0105264 | A1 | 6/2004 | Spero |
| 2005/0128751 | A1 | 6/2005 | Roberge et al. |
| 2006/0002110 | A1 | 1/2006 | Dowling et al. |
| 2008/0259012 | A1* | 10/2008 | Fergason ............ G02B 5/3083 345/89 |

(Continued)

FOREIGN PATENT DOCUMENTS

DE  10 2010 033 351 A1  2/2012

*Primary Examiner* — Minh D A
(74) *Attorney, Agent, or Firm* — DLA Piper LLP (US)

(57) ABSTRACT

A method of operating a lighting device with a light-emitting component, in which the light-emitting component includes a plurality of pixels configured to illuminate a plurality of zones in a field of view, the light-emitting component includes a processing device including characterization data of the light-emitting component, and the pixels of the light-emitting component are operated as a function of the characterization data, wherein to determine characterization data prior to intended operation of the lighting device an intensity and/or a color location of the emitted light of a pixel or of each pixel is measured as a function of an operating current.

18 Claims, 12 Drawing Sheets

(51) Int. Cl.
*G03B 15/02* (2006.01)
*H05B 45/24* (2020.01)

(58) Field of Classification Search
CPC .............. G09G 2310/027; G09G 5/006; G06F 17/175; G06F 17/17; G01N 21/8903; G01N 21/86; G01N 21/89; G01N 21/8806; G01N 21/94; G01N 2021/8887; G01N 21/8422; G01N 21/88; G01B 11/024; G01B 11/0608; H05B 45/20; H05B 45/24; H05B 47/105; G03B 15/07; G03B 15/02

See application file for complete search history.

(56) References Cited

U.S. PATENT DOCUMENTS

| | | | |
|---|---|---|---|
| 2011/0169414 A1 | 7/2011 | Schmitz | |
| 2011/0254554 A1* | 10/2011 | Harbers | G01K 11/00 324/414 |
| 2012/0206050 A1 | 8/2012 | Spero | |
| 2012/0236555 A1 | 9/2012 | Pedersen et al. | |
| 2013/0147777 A1 | 6/2013 | Lau et al. | |
| 2014/0015824 A1 | 1/2014 | Chaji et al. | |
| 2014/0028861 A1* | 1/2014 | Holz | H04N 5/23277 348/208.4 |
| 2014/0055039 A1 | 2/2014 | Huang | |
| 2014/0183269 A1* | 7/2014 | Glaser | G06F 21/32 235/492 |
| 2014/0319318 A1 | 10/2014 | Huang | |
| 2016/0286619 A1 | 9/2016 | Roberts et al. | |

* cited by examiner

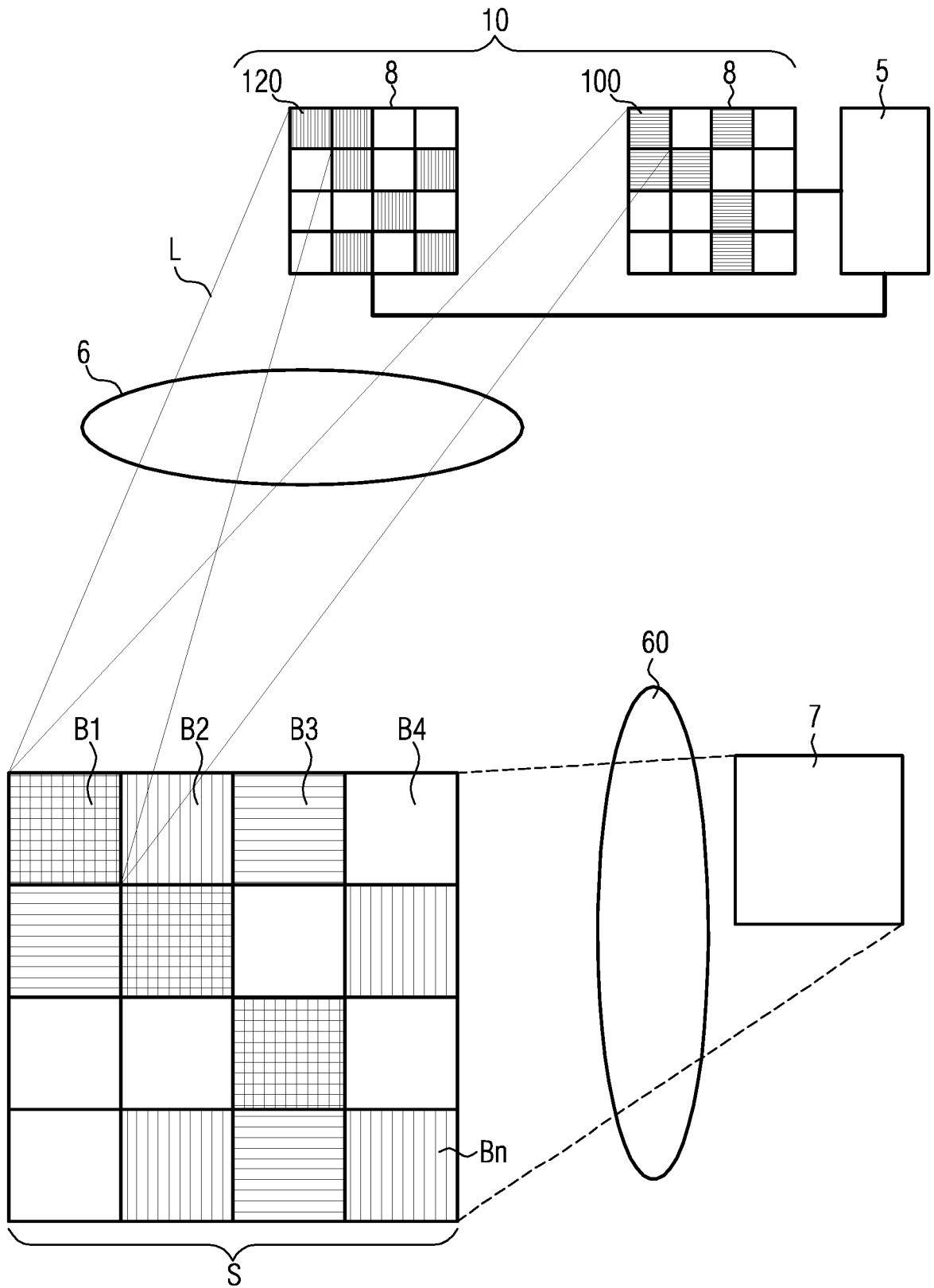

METHOD OF OPERATING A LIGHTING DEVICE

TECHNICAL FIELD

This disclosure relates to a method of operating a lighting device.

BACKGROUND

Among other things, there is a need to provide a method of operating a lighting device that is particularly efficient and enables particularly flexible lighting.

SUMMARY

We provide a method of operating a lighting device with a light-emitting component, in which the light-emitting component includes a plurality of pixels configured to illuminate a plurality of zones in a field of view, the light-emitting component includes a processing device including characterization data of the light-emitting component, and the pixels of the light-emitting component are operated as a function of the characterization data, wherein to determine characterization data prior to intended operation of the lighting device an intensity and/or a color location of the emitted light of a pixel or of each pixel is measured as a function of an operating current.

We also provide a method of operating a lighting device with a light-emitting component, in which the light-emitting component includes a plurality of pixels configured to illuminate a plurality of zones in a field of view, the light-emitting component includes first-type pixels and second-type pixels, the first-type pixels and the second-type pixels emit light of different wavelength ranges, at least some of the zones are illuminable simultaneously with the light of a first-type pixel and a second-type pixel, the light-emitting component includes a processing device including characterization data of the light-emitting component, the pixels of the light-emitting component are operated as a function of the characterization data, wherein to determine characterization data prior to the intended operation of the lighting device an intensity and/or a color location of the emitted light of a pixel or of each pixel is measured as a function of an operating current, a set point including a brightness set point and a color location set point, is assigned to a zone, the zone has an actual value including an actual brightness value and an actual color location, and the actual value of the zone is approximated to the set point in several steps.

BRIEF DESCRIPTION OF THE DRAWINGS

FIGS. 5A and 5B each show a method of operating a lighting device, wherein the light-emitting component comprises two semiconductor chips.

Figure 1A:
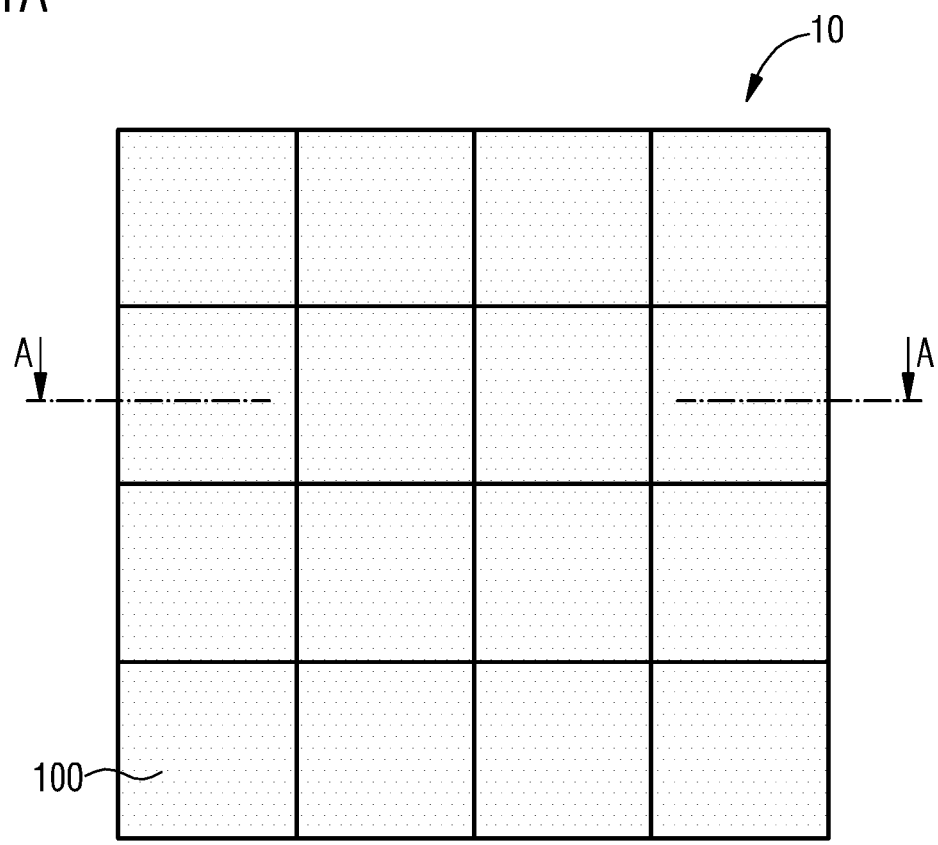
FIGS. 1A, 1B, 2A and 2B show examples of a light-emitting component used in the method of operating a lighting device.

REFERENCE NUMERALS 1 lighting device
10 light-emitting component
100 pixel
110 first-type pixel
120 second-type pixel
21 moisture sensor
22 temperature sensor
4 wiring layer
5 processing device
6 optical device
60 imaging optics
7 sensor
8 semiconductor chip
9 identifier
B image zone
B1 first image zone
B2 second image zone
B3 third image zone
B4 forth image zone
Bn nth image zone
F moisture
T temperature
S field of view
Z control value
Φ luminous flux
E illuminance
IS operating current
D characterization data
SO set point
SF color location set point
SH brightness set point
I actual value
IF actual color value
IH actual brightness value
T1 first color bin
T2 second color bin
V' ordinate in CIE976 color space
U' abscissa in CIE976 color space
ΔE relative illuminance

DETAILED DESCRIPTION

Our lighting device comprises a light-emitting component. The light-emitting component is configured, for example, to emit electromagnetic radiation. In particular, the light-emitting component is configured to emit light in the visible wavelength range, between infrared and UV radiation, during normal operation. For example, the light-emitting component is formed with a semiconductor structure comprising an active region. During normal operation of the light-emitting component, light is generated in the active region. In particular, the light-emitting component has a main surface through which a large part, at least 80%, of the light is emitted.

In the method of operating a lighting device, the light-emitting component may comprise a plurality of pixels configured to illuminate a plurality of zones in a field of view. For example, the individual pixels can be controlled separately from one another. The pixels of a semiconductor chip can be arranged side by side in the lateral plane at the nodes of a rectangular grid. The lateral plane runs parallel to the main extension plane of the light-emitting component.

The light-emitting component comprises, for example, a multiplicity of semiconductor chips arranged next to one another in a lateral plane at the nodal points of a rectangular lattice. For example, each pixel is formed with a semiconductor chip, wherein each semiconductor chip can be manufactured in a separate manufacturing process. Alternatively, a semiconductor chip includes a plurality of pixels manufactured in a common manufacturing process. For example, the pixels are formed with semiconductor layers produced by a common epitaxial process. The lateral extent of a single pixel is limited, for example, by trenches that cut through at least one of the semiconductor layers. The trenches may be produced, for example, by a lithographic process. Alternatively, the pixels have continuous semiconductor layers, wherein the extent of the individual pixels in the lateral direction is defined by the lateral extent of contact structures through which the pixels are supplied with current.

The field of view is, for example, the field of view of a camera that defines a region in an object space imaged on a sensor of the camera. The field of view is subdivided into a plurality of zones displayed side by side on the sensor in a plane. In particular, the zones border directly on each other. For example, every point within the field of view can be assigned to a zone. In particular, zones may be arranged at least partially overlapping so that some points in the field of view may be assigned to several zones.

The light-emitting component is configured to illuminate the zones, in particular all zones. For example, light emitted during normal operation of the light-emitting component is directed to the zones in the field of view.

The lighting device may comprise a processing device. The processing device comprises, for example, a memory and a processor. The memory may be configured to store electronic data. For example, the memory is a RAM memory. The processor may be configured to receive electronic data, retrieve electronic data, perform arithmetic operations, and output data and/or drive signals. For example, the processing device is a microcontroller.

In particular, the light-emitting component and the processing device connect to one another in an electrically conductive manner. For example, the light-emitting component and the processing device are arranged in a composite. For example, the processing device is disposed on a main surface of the light-emitting component and mechanically fixedly connected to the light-emitting component. The light-emitting component and the processing device can be connected to one another by at least one, in particular a plurality of, solder connections. The processing device may be configured to control and operate the light-emitting component during normal operation. For example, during normal operation, the light-emitting component is operated by the processor as a function of input data and data stored in the memory.

Alternatively, the processing device may be arranged spatially separated from the light-emitting component and may connect to the light-emitting component via electrically conductive strip conductors.

The memory may comprise characterization data of the light-emitting component. For example, the memory comprises characterization data determined prior to the intended operation of the light-emitting component and are stored in the memory. The characterization data may be the dependence of the color location and/or the intensity of the emitted light of a pixel or each pixel on factors such as the current with which the individual pixels are operated, an operating time of the pixels, a moisture of the environment, production-related fluctuations of brightness and/or color location of the emitted light and/or a temperature of the light-emitting component. In particular, the characterization data may include the relationship between the intensity or color location of the emitted light of each pixel and the factors.

The pixels of the light-emitting component may be operated as a function of stored characterization data. The light-emitting component may be configured to illuminate the zones in the field of view. In particular, the pixels are operated with a predetermined current so that the zones are illuminated with light of a predetermined intensity and a predetermined color location. The color location and the intensity of the emitted light may depend on factors such as operating current, temperature of the light-emitting component, fluctuations resulting from manufacturing processes, operating time, and moisture of the environment. The relationship between the factors and the color location and/or the intensity of the emitted light is stored in the memory of the lighting device in the form of characterization data. During operation of the light-emitting component, the stored characterization data are used to emit light of a predetermined color location and a predetermined intensity by the light-emitting component.

The light-emitting component may comprise a plurality of pixels configured to illuminate a plurality of zones in a field of view. The light-emitting component may comprise a processing device which has characterization data of the light-emitting component and the pixels of the light-emitting component are operated as a function of the characterization data.

Our method of operating a lighting device is based, inter alia, on the following considerations. Lighting devices generally include light-emitting components that illuminate all zones of a field of view at the same time. By way of example, the lighting device comprises one or more light-emitting components, each of which is configured to completely illuminate the entire field of view. The entire field of view is illuminated with light of a predetermined intensity and a predetermined color location. Zones of the field of view for which a different color location of the illumination or a different illumination intensity would be desirable compared to other zones of the field of view may not be optimally illuminated.

The method of operating a lighting device makes use, inter alia, of the idea of subdividing the field of view into individual zones that can be separately illuminated by a pixelated light-emitting component. In particular, the individual zones can be illuminated separately from each other with light of a predetermined color location and a predetermined brightness. For the partial illumination of the field of view, the brightness and the color location of the emitted light must be adjustable particularly precisely. For this purpose, for example, characterization data of the light-emitting component are stored in a memory so that the operating current can be selected as a function of factors such as component temperature, ambient moisture and/or operating time.

Advantageously, by such a method of operating a lighting device, individual zones of a field of view can be specifically illuminated with light of a predetermined color location and a predetermined intensity so that the field of view can be imaged particularly well on a sensor.

The light-emitting component may comprise first-type pixels and second-type pixels. For example, the first-type pixels and the second-type pixels are arranged next to one another in a common lateral plane. In particular, the first-type pixels and the second-type pixels are arranged in the lateral plane at the nodes of a regular rectangular grid. By way of example, the first-type pixels and the second-type pixels are arranged alternately. Alternatively, the first-type pixels and the second-type pixels may be arranged in groups, with only pixels of one type being arranged adjacent to each other within a group. For example, pixels of one type are arranged on a common semiconductor chip and are produced in a common manufacturing process. Alternatively, the pixels of different types may be arranged on a common semiconductor chip and may be provided in a common method.

In particular, the light-emitting components comprises third-type pixels. For example, the third-type pixels are configured to emit warm white greenish light. The third-type pixels and the second-type and/or first-type pixels may be arranged adjacent to each other in a common lateral plane. For example, the first-type pixels, the second-type pixels, and the third-type pixels are alternately arranged. Alternatively, the first-type pixels, the second-type pixels and third-type pixels may be arranged in groups, wherein within a group, only pixels of one type are arranged adjacent to one another.

The first-type pixels and the second-type pixels emit light of different wavelength ranges. For example, the first-type pixels emit light of a cold white color location and the second-type pixels emit light of a warm white color location. Alternatively, the first-type pixels emit light in the red wavelength range, in the green wavelength range or in the blue wavelength range.

For example, pixels of different types are formed with different semiconductor materials. Alternatively, pixels of different types may be formed with the same semiconductor material and have conversion elements. The conversion elements may be configured to convert light generated in the pixels to light of another wavelength range. In particular, the color locations and/or the intensities of the light emitted by the pixels can be adjusted by the conversion elements.

At least some of the zones may be illuminable simultaneously with the light of a first-type pixel and a second-type pixel. For example, at least some, in particular all, of the zones are illuminable with both the light of a first-type pixel and the light of a second-type pixel. In particular, the light of the pixels of different types is mixed when the pixels of different types illuminate a common zone. Thus, when simultaneously illuminating a zone by the light from pixels of different types, the observer perceives the light in these zones as mixed light. Advantageously, by targeted control of first-type pixels and second-type pixels, each zone can be illuminated separately with light of a predetermined color location and a predetermined intensity.

The pixels of different types may be arranged on spaced-apart semiconductor chips or formed by spaced-apart semiconductor chips. For example, each semiconductor chip comprises a plurality of pixels that can be operated separately from one another. Alternatively, the lighting device comprises a plurality of semiconductor chips, each comprising a pixel. In particular, pixels of different types are not manufactured in the same manufacturing process. Advantageously, mutually adjacent pixels that are part of a common semiconductor chip, have a particularly small distance to each other, for example, of a maximum of 5 µm. Furthermore, the pixels can be operated particularly efficiently since the semiconductor material with which the pixels are formed is each controlled for the emission of the desired color location.

Alternatively, pixels of different types can be made with the same manufacturing process, wherein the different color locations of the light are generated by conversion elements. In particular, pixels of different types can be arranged on a common semiconductor chip. For example, at least pixels of one type have a conversion element that converts light generated in the semiconductor chip into light of a different wavelength range. For example, the conversion elements may be arranged in the form of a checkerboard pattern so that, for example, pixels of different types are arranged alternately next to one another.

The lighting device may comprise an optical device configured to direct the light of a first-type pixel and a second-type pixel to at least some zones. For example, the light from at least one first-type pixel and at least one second-type pixel is directed into a common zone by the optical device.

The optical device may be configured to mix the light from pixels of different types in the zone. In particular, with simultaneous operation of pixels of different types associated with a common zone, the light in zones associated with the pixels is perceived as mixed light. For example, the optical device is configured to direct to each zone light of a pixel of each type. Pixels of different types whose light is directed into a common zone may be, for example, arranged adjacent to each other.

In particular, the optical device is adapted to mix light from non-adjacent pixels and direct them into a common zone. Non-adjacent pixels are pixels between which no further pixels are arranged in a lateral direction. Advantageously, the optical device makes it possible to use a separate semiconductor chip for first-type pixels and second-type pixels, wherein the semiconductor chips can be arranged laterally next to each other. Thus, the optical device enables a simplified structure of the light-emitting component.

The characterization data may be determined at least in part prior to the intended operation of the component, the characterization data may be stored in the processing device of this component and the pixels may be operated as a function of these characterization data. For example, each component is characterized prior to its intended operation to determine the characterization data. During characterization, for example, the color location and/or the intensity of the emitted light is determined depending on the factors such as the ambient temperature, the temperature of the light-emitting component, the moisture of the environment, the operating time and the manufacturing process. In particular, the characterization data are determined and stored in a further memory that is not part of the processing device. Subsequently, the characterization data is transferred to the memory which is part of the processing device.

The characterization data are written, for example, directly after characterization on a memory integrated in the lighting device. Alternatively, the characterization data are first stored on a medium separated from the lighting device.

In particular, each component is operated in normal operation as a function of the characterization of exactly the same component. Advantageously, a characterization of each component and a subsequent operation with the characterization data of this component enables a particularly precise setting of the color location and/or the intensity of the emitted light.

The characterization data of a representative component may be determined and the light-emitting component is operated as a function of the characterization data of the representative component. For example, the characterization data of a plurality of representative components are determined and averaged. Subsequently, the averaged characterization data of the representative components are deposited in the processing device lighting devices with non-representative components, and the non-representative components are operated on the basis of the averaged characterization data. Advantageously, it is not necessary to determine the characterization data of each light-emitting component before the intended operation to ensure precise control of light-emitting components. Thus, determination of the characterization data can be carried out particularly in a time-saving way.

The characterization data of each pixel of the light-emitting component may be determined prior to the intended operation of the light-emitting component and the pixels of the light-emitting component may be operated as a function of these characterization data. For example, each pixel of a light-emitting component is individually characterized. The characterization data may include, for example, dependence of the color location and/or intensity of the emitted light on factors such as the operating time, the temperature, the moisture, and/or the operating current of each pixel. In particular, the characterization data of each pixel may be determined from each light-emitting component or each pixel of representative components. Advantageously, the operation of the light-emitting component as a function the characterization data of each pixel allows a particularly accurate control of the individual pixels of the light-emitting component.

The characterization data of representative pixels of the light-emitting component or of the representative component may be determined and the pixels of the light-emitting component may be operated as a function of these characterization data. For example, only some pixels of a light-emitting component or a representative component are characterized. These characterization data can be stored in the memory of the processing device during operation of the light-emitting component so that all pixels of the light-emitting component are operated as a function of the characterization data of representative pixels. Advantageously, using the characterization data of representative pixels enables a particularly time-saving determination of the characterization data.

A temperature of the light-emitting component may be measured during operation of the lighting device Further, the characterization data may include a temperature behavior and the light-emitting component may be operated as a function of the measured temperature and the characterization data. For example, the temperature of the light-emitting component is measured inside the light-emitting component or in the surrounding of the light-emitting component by the temperature sensor. For example, the measured temperature is transmitted to the processing device that controls the pixels as a function of the measured temperature and the characterization data and operates them with an operating current.

In particular, the processor accesses characterization data stored in the memory. The characterization data include dependence of the color location and/or intensity on the temperature of the pixel respectively the component. In particular, the characterization data includes the temperature dependence of the color location and/or the intensity of the emitted light of each pixel or representative pixels of each light-emitting component or representative component. Advantageously, the light-emitting component can be operated particularly precisely as a function of the measured temperature by the temperature sensor.

The moisture of the surroundings of the light-emitting component may be measured. Further, the characterization data may include the moisture behavior of the light-emitting component and the light-emitting component may be operated as a function of the measured moisture and the characterization data. For example, the moisture of the light-emitting component is measured inside the light-emitting component or in the surrounding of the light-emitting component by the moisture sensor. For example, the measured moisture is transmitted to the processor that controls the pixels as a function of the measured moisture and operates them with an operating current.

In particular, the processor accesses characterization data stored in the memory. The characterization data include dependence of the color location and/or intensity on the moisture of the pixel or the component. In particular, the characterization data includes the dependence on the ambient moisture of the color location and/or the intensity of the emitted light of each pixel or representative pixels of each light-emitting component or a representative component. Advantageously, the light-emitting component can be operated particularly precisely as a function of the measured moisture by the moisture sensor.

The operating time of the light-emitting component may be measured during operation of the lighting device. Furthermore, the characterization data include the aging behavior of the light-emitting component and the light-emitting component may be operated as a function of the measured operating time and the characterization data. For example, the operating time of each pixel of the lighting device is measured separately. In particular, the characterization data comprise dependence of the color location and/or intensity of the emitted light of each pixel or representative pixels of the light-emitting component or a representative component on the operating time. Advantageously, based on the measured operating time of each pixel of the light-emitting component, the color location and/or the intensity of the light to be emitted can be set particularly precisely as a function of the operating time.

The processing device may be integrated in the light-emitting component. In particular, the processing device comprises a memory and a processor integrated in the light-emitting component. The processor can be configured to control the individual pixels of the light-emitting component separately from one another and supply them with current. In particular, the processor is configured to retrieve the characterization data from the memory and operate the pixels of the light-emitting component separately from one another as a function of further control values and/or measured values. In particular, the processing device mechanically fixedly connects to the pixels of the light-emitting component. By way of example, the processing device mechanically fixedly connects electrically conductively to the pixels of the light-emitting component via a wiring plane.

In particular, the pixels and the processing device are integrated in a common semiconductor chip. For example, the pixels and the processing device mechanically and electrically conductively connect to one another by a solder connection or a bond connection. In particular, the processing device is a microcontroller. Advantageously, the integration of the processing device in the light-emitting component allows a particularly compact design and reduces the risk of incorrect assignment of characterization data and light-emitting component to each other.

The characterization data may be clearly assigned to a light-emitting component by an identifier. For example, the light-emitting component has a unique identification number, a barcode, a point code or an electronically readable identifier such as a bit pattern. The set of characterization data may have an identifier assignable to the component so that the characterization data can be uniquely assigned to the light-emitting component. Advantageously, by identifier which uniquely assigns the characterization data to a component, it is possible to avoid a misassignment.

To determine characterization data prior to the intended operation of the lighting device, an intensity and a color location of the light emitted by each pixel may be measured as a function of an operating current and stored in the processing device. In particular, this dependence is measured several times, with different factors being changed in each measurement. By way of example, a plurality of measurements are carried out at a different temperature of the light-emitting component, with different moisture of the surroundings of the light-emitting component and/or with a different operating time of the light-emitting component. Advantageously, based on the characterization data that include dependency of the color location and/or intensity of the emitted light on the operating current, the light-emitting component can be operated particularly precisely.

The lighting device may be controlled by a control value, wherein the brightness and/or the color location of each pixel depend linearly on the control value. In particular, the control value comprises two input values by which the intensity and color location of the light to be emitted of each pixel can be determined during normal operation. Advantageously, operation of the lighting device on the basis of the control value that is linearly related to the brightness and color location of the emitted light, is particularly simple.

A set point comprising a brightness set point and a color location set point, may be assigned to a zone. Furthermore, a zone may have an actual value comprising an actual brightness value and an actual color location. In this example, the actual value of the zone is approximated in several process steps to the set point. For example, the brightness set point is set by a user or determined by the processor. For example, a set point is assigned to a plurality of zones, in particular all zones.

The actual value of each zone is measured, for example, by a sensor and determined by the processing device. For example, the actual value of a zone can be approximated to the set point during the intended operation of the light-emitting component. In particular, the actual values are approximated to the set points by illuminating the zones. Advantageously, by adaptation of actual values to the set points, illumination of the field of view can be controlled.

In a method step A, a current actual value of the zone may be determined without operation of the light-emitting component. For example, the lighting device comprises a sensor or is part of a camera with a sensor. In particular, the field of view is imaged on the sensor. When determining the actual values, the color location and/or the brightness in the zones of the field of view can be determined by the sensor. In particular, in method step A), the intensity and/or the color location in the field of view can be determined by a particularly long integration time, for example, an integration time of at least 200 milliseconds, in particular of at least two seconds.

Furthermore, as an example, in a method step B, the light-emitting component is operated as a function of the characterization data, the determined actual value and the set point of the zone, and at the same time a current actual value of the zone is determined during operation of the light-emitting component. For example, the pixels of the component are operated with an estimated operating current or with a predetermined operating current so that the current actual value is as close as possible to the set point. In particular, the light-emitting component is operated with an operating current that is not the maximum and not the minimum operating current of the light-emitting component.

In a method step C, the light-emitting component may be operated as a function of the characterization data, the previously determined actual values and the set point so that the difference between the most recent actual value from method step B and the set point is minimized and a further current actual value is determined. In particular, the method of operating an lighting device comprises at least the method steps A to C to adapt the actual values of the zones of the field of view to the set points by illumination with the lighting device. Advantageously, illumination of the zones of the field of view is controlled by method steps A to C so that the current actual values of the zones are as close as possible to the set points of the zones.

Method step C may be carried out several times. Within each time, method step C may be repeated, a current actual value of the zone determined during operation of the light-emitting component, and the method step C repeated until the difference between the current actual values and the set points is less than a predetermined value. In particular, process step C is carried out at most 50 times, preferably at most 10 times. Advantageously, the difference between current actual values and set points is further reduced each time the method step C is repeated. In particular, the set point may include a range of values within which the color location and/or the brightness of a zone should lie. Advantageously, by a multiple repetition of the method step C, a particularly small difference between actual values and set points can be achieved.

Only the differences between the actual values and the set points of some selected zones of the lighting device are minimized during operation. For example, only the differences of the actual values and the set points of the zones are minimized, in which the illumination by the lighting device has a sufficient effect. In other words, the difference between actual values and set points is minimized only in zones in which the brightness and/or the color location of the zone can be influenced by the lighting device. For example, zones to be illuminated in the field of view may have too great a distance than that their brightness and/or color location can be adjusted by the lighting device so that an adjustment of the actual values to set points is dispensed within these zones and the difference between the actual value and the set point of these zones is not minimized. Advantageously, this allows a particularly energy-saving operation of the lighting device since only zones are illuminated whose color location and/or brightness can be influenced by the lighting device.

The lighting device may be operated as a flashlight. For example, the lighting device is operated as long as a measurement is performed by the sensor. In particular, the lighting device is operated for a maximum of one second at a time. For example, the pixels are operated with a predetermined direct current. Alternatively, the pixels are operated with a pulse width modulated signal (short: PWM signal). Advantageously, the lighting device can be operated with particularly high current densities since in a flash mode, the heating of the light-emitting component is limited so that even with poor heat dissipation sufficient cooling can be provided.

Advantages and developments of the method of operating a lighting device will become apparent from the examples described below in association with the figures.

In the examples and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

FIG. 1A shows a schematic plan view of a lateral plane of a light-emitting component 10 of a lighting device 1 described here. The lateral plane runs along the main extension plane of the light-emitting component 10. The lighting device 1 comprises a light-emitting component 10 with a multiplicity of pixels 100 arranged side by side in the lateral plane at the lattice points of a regular rectangular lattice. The pixels 100 are configured to emit light during normal operation. In particular, the pixels 100 are configured to be operated separately from each other. The pixels may each be formed with separate semiconductor chips produced separately from one another by different production methods. Alternatively, the pixels may be part of a common semiconductor chip and produced in a common production process.

For example, the pixels 100 are configured to emit light in the visible wavelength range. In particular, the pixels 100 are configured to emit light of a warm white and/or cold white color location. Warm white light has a color temperature of less than 3300K. Cold white light has a color temperature of more than 3300 K.

Figure 1B:
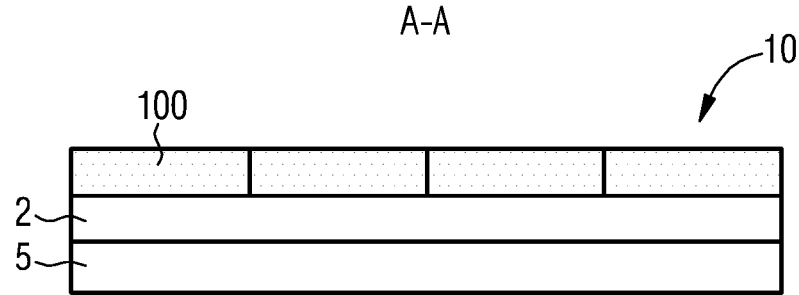

FIG. 1B shows a sectional view of the light-emitting component 10 of FIG. 1A along the section line AA. The pixels 100 of the light-emitting component 10 are arranged on a processing device 5. In particular, the processing device 5 is integrated in the light-emitting component. The processing device 5 comprises a memory and a processor. For example, the processing device 5 is a microcontroller directly mechanically connected to the pixels 100 of the light-emitting component. For example, the processing device has contact surfaces on a side facing the pixels 100, via which the pixels 100 electrically and mechanically connect to the processing device 5. In the memory of the processing device 5, for example, characterization data D are deposited as a function of which the light-emitting component is operated.

Figure 2A:
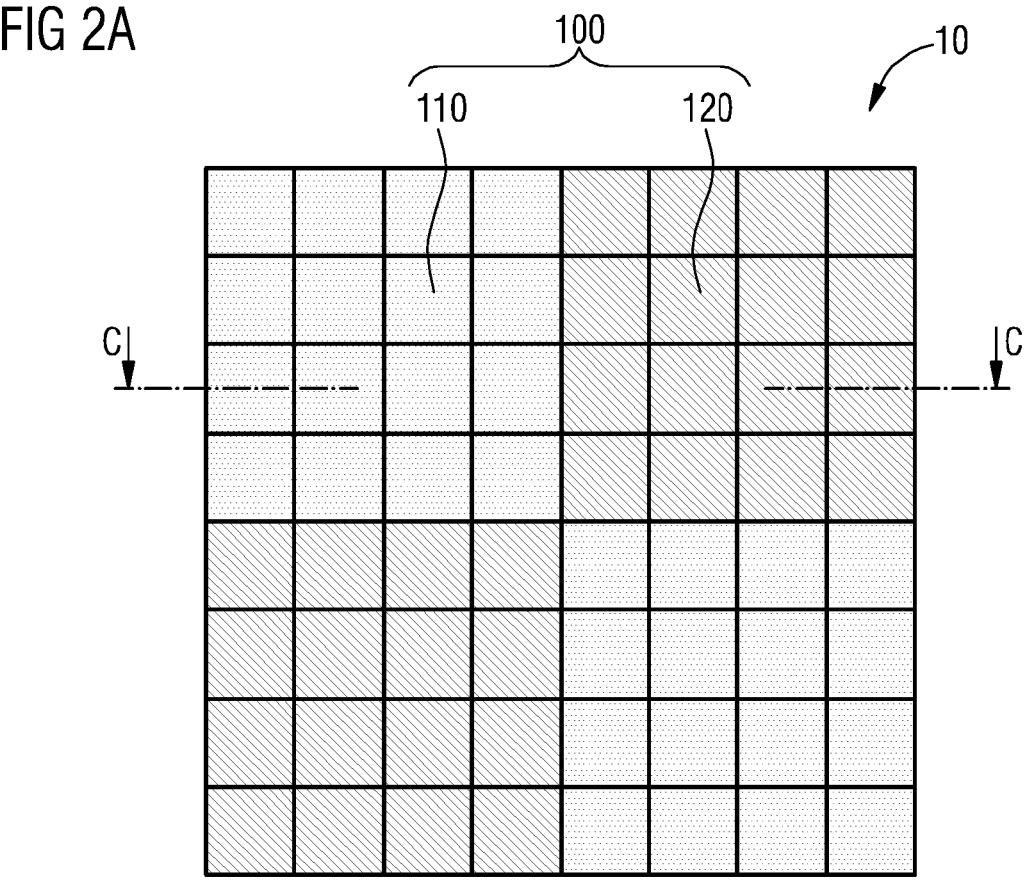

FIG. 2A shows an alternative example of a light-emitting component 10 comprising first-type pixels 110 and second-type pixels 120. The first-type pixels 110 and the second-type pixels 120 are arranged in a common lateral plane at the nodes of a regular rectangular grid. For example, the first-type pixels 110 and the second-type pixels 120 are grouped such that each first-type pixel 110 and each second-type pixel 120 are disposed adjacent to at least two other pixels 100 of the same type. The first-type pixels 110 and the second-type pixels 120 are configured to emit light L of different wavelength ranges. For example, first-type pixels 110 are configured to emit light of a cold white color location. For example, second-type pixels 120 are configured to emit light of a warm-white color location.

For example, first-type pixels 110 are formed with a different semiconductor material than second-type pixels 120. Alternatively, first-type pixels 110 are formed with the same semiconductor material as second-type pixels 120, and the different color locations of the first-type pixels 110 and second-type pixels 120 are generated by conversion.

Figure 2B:
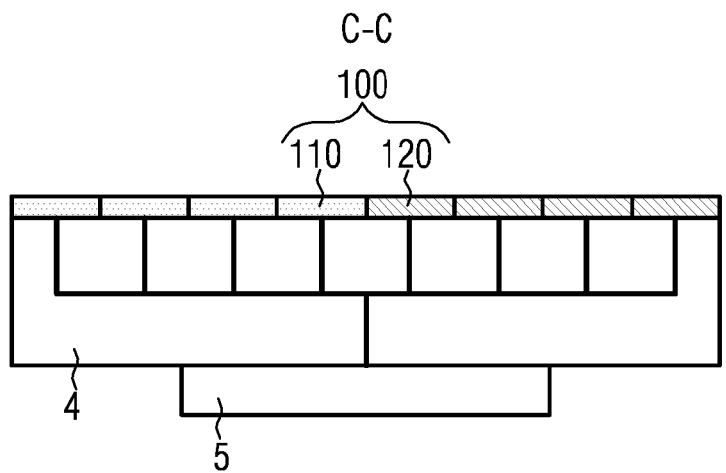

FIG. 2B shows a sectional view of the light-emitting component 10 shown in FIG. 2A, along the section line CC. The first-type pixels 110 and the second-type pixels 120 are arranged on a wiring layer 4. For example, the wiring layer 4 is the mechanically supporting structure on which the first-type pixels 110 and the second-type pixels 120 are arranged. On the side facing away from the pixels 100 of the wiring layer 4, a processing device 5 is arranged. The pixels 100 are controlled and operated by the processing device 5. The memory of the processing device 5 comprises characterization data D retrieved by the processor and dependent on which the pixels 100 are supplied with current.

Figure 3A:
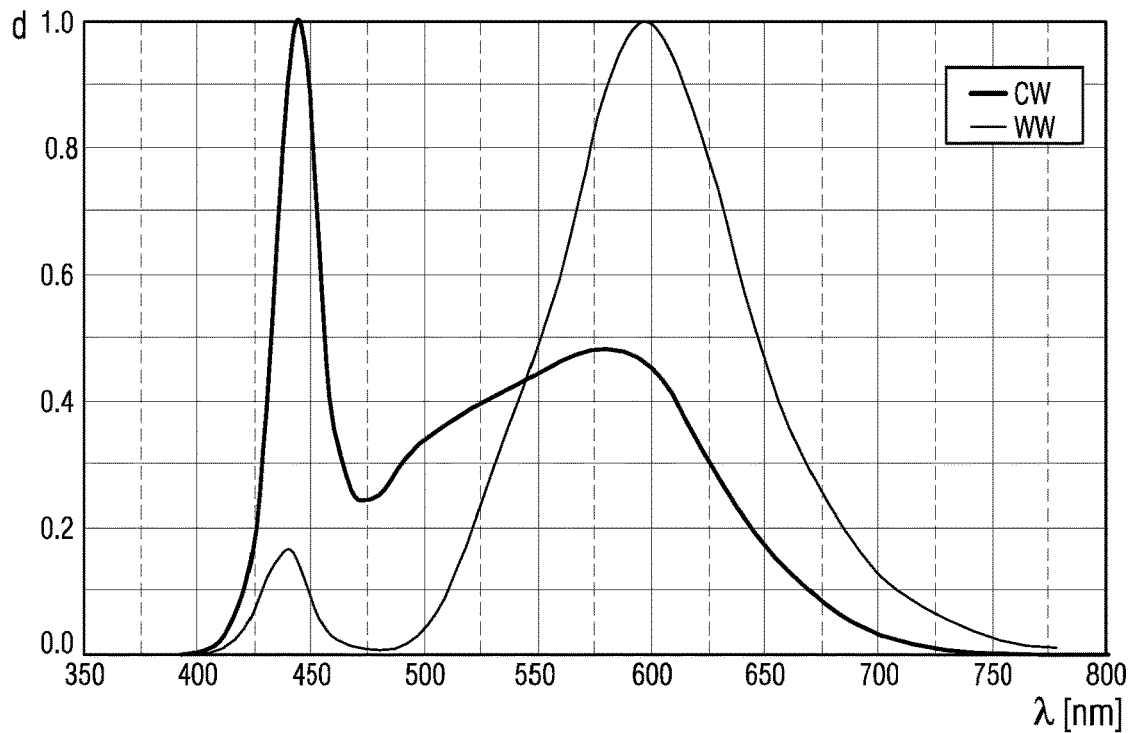
FIGS. 3A to 3J show examples of characterization data stored in a memory and used in the method of operating a lighting device.

FIG. 3A shows the relative spectral emission d of a cold white first-type pixel 110, labeled "CW", and a second-type warm white pixel 120 labeled "WW". These data may be stored as characterization data D in the processing device 5 of the lighting device 1. For example, an actual color location IF of individual zones B in the field of view S is determined by a sensor 7. Based on the characterization data D that includes the relative spectral emission of the pixels, zones B are illuminated with light. Thus, advantageously, a zone B can be illuminated with light L of a color location having a color location similar to the actual color location IF already measured in the zone B.

Figure 3B:
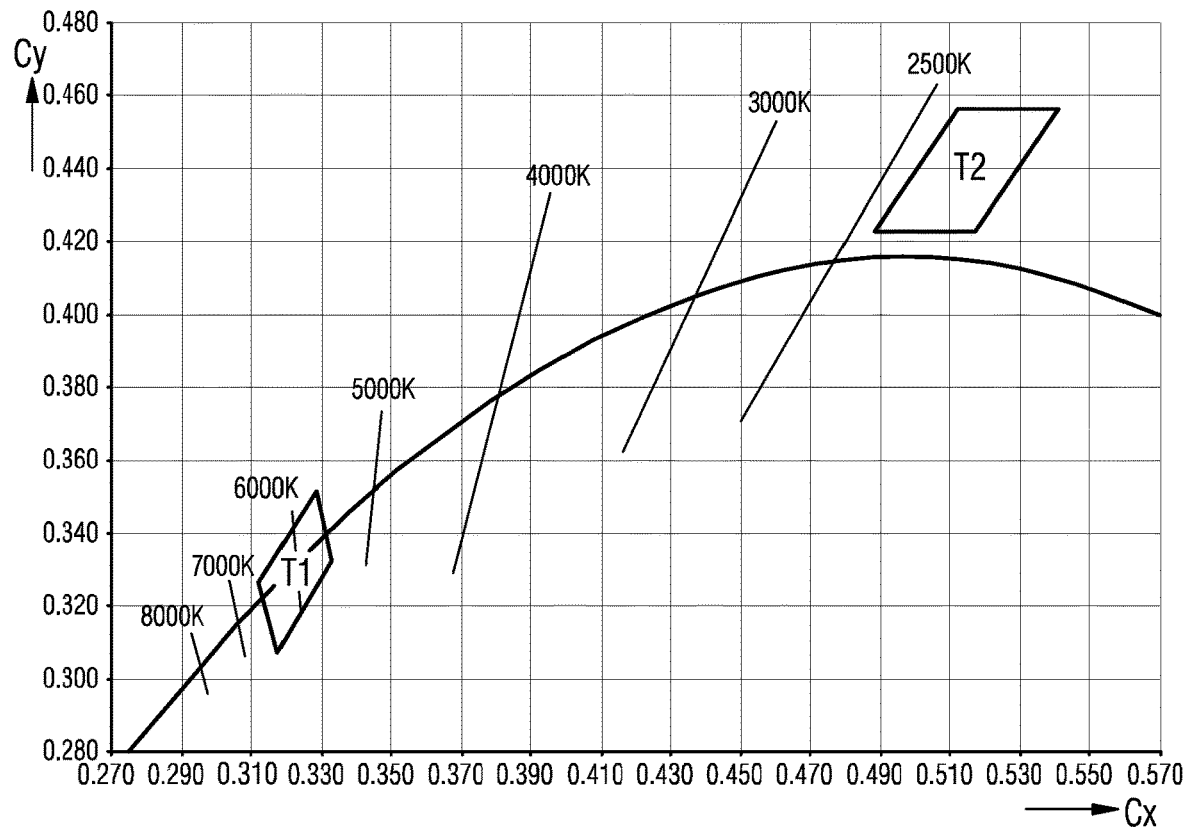

FIG. 3B shows exemplary characterization data D of pixels 100 of a light-emitting component 10. The characterization data D comprise, for example, the position of a first color bin T1 of a first-type pixel 110 in the CIE color space configured to emit light of a cold-white color location. Furthermore, the characterization data D comprises the position of a second color bin T2 of a second-type pixel 120 in the CIE color space set up to emit light of a warm white color location. For example, the color location of the emitted light of the totality of pixels of the same type can thus be described.

Figure 3C:
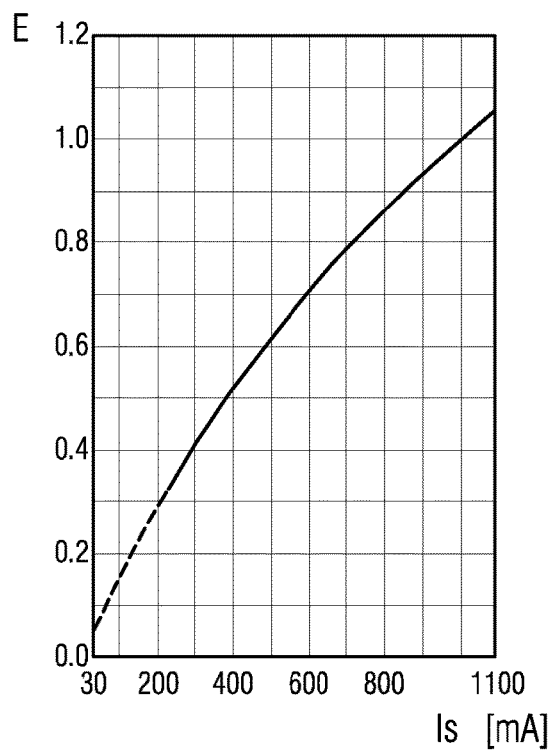

FIG. 3C shows exemplary characterization data which include the relative illuminance E as a function of an operating current IS of 0 mA to 1100 mA. In this example, the relative illuminance E monotonically increases with increasing operating current IS. In particular, the relative illuminance E is not a linear function of the operating current IS. In an alternative example, however, there may be a linear relationship between the operating current IS and the illuminance E. In particular, the intensity of the emitted light of each pixel 100 may depend linearly on the operating current IS.

Figure 3D:
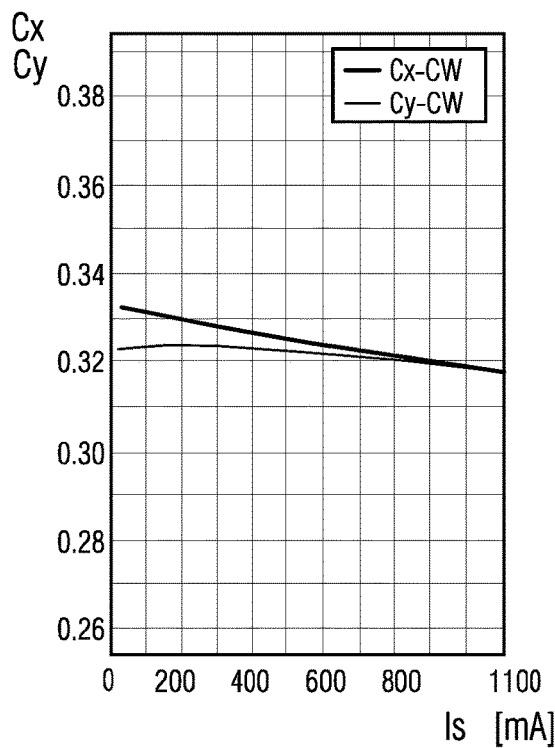

FIG. 3D shows the dependency of the color location with the chromaticity coordinates CX and CY of the emitted cold white light of a pixel as a function of the operating current IS. The chromaticity coordinate CX shows approximately a linear, monotonically decreasing behavior with increasing operating current IS. The color coordinate CY has a slight increase up to an operating current IS of approximately 200 mA. From about 200 mA to 1100 mA, the color coordinate CY has a monotonously decreasing behavior with increasing operating current IS. These characterization data D are measured at an ambient temperature of 25° C.

Figure 3E:
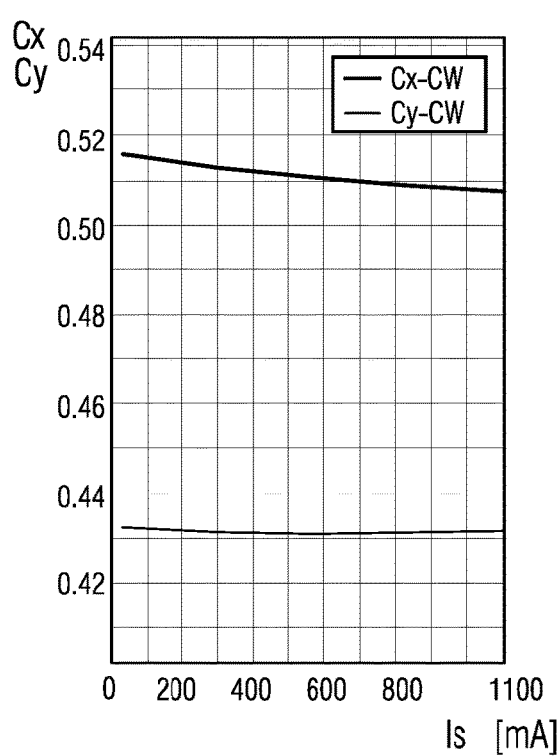

FIG. 3E shows the dependence of the color location on the chromaticity coordinates CX and CY of the emitted cold white light of a pixel as a function of the operating current IS. The CX component of the color location of the warm-white pixel shows a monotonously decreasing behavior with increasing operating current. The CY component has a monotonously decreasing behavior up to an operating current IS of 500 mA and a monotonically increasing behavior up to an operating current IS of 500 mA to 1,100 mA. These characterization data D are measured at an ambient temperature of 25° C.

Figure 3F:
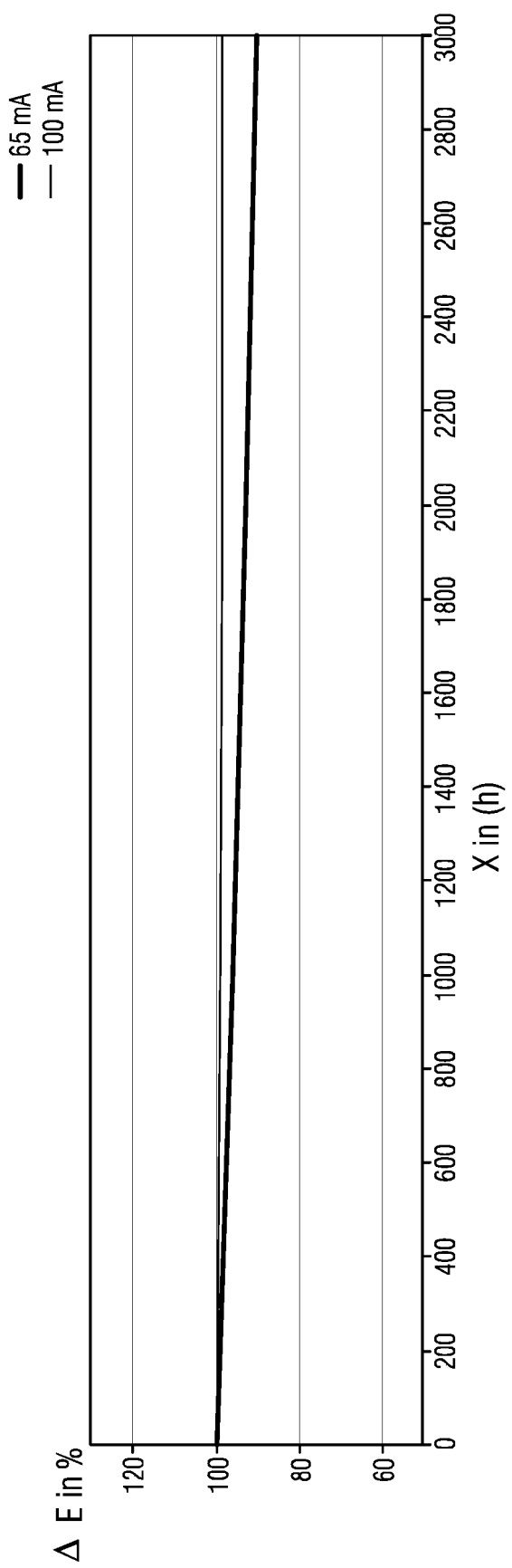

FIG. 3F shows the relative illuminance ΔE of a cold white pixel at a constant operating current as a function of the operating time X at an operating current of 65 mA and 100 mA. The emitted light L of the pixel 100 that is operated at 65 mA decreases monotonously with increasing operating time X. After an operating time X of 3,000 hours, the intensity of the emitted light L has fallen to approximately 95% of the initial value. The operating temperature is 100° C. The pixel 100 that is operated with an operating current of 100 mA, has an operating temperature of 100° C. The intensity of the emitted light L is monotonously decreasing with increasing operating time. After an operating time X of 3,000 hours, the intensity of the emitted light L has fallen to approximately 98% of the initial value.

Figure 3G:
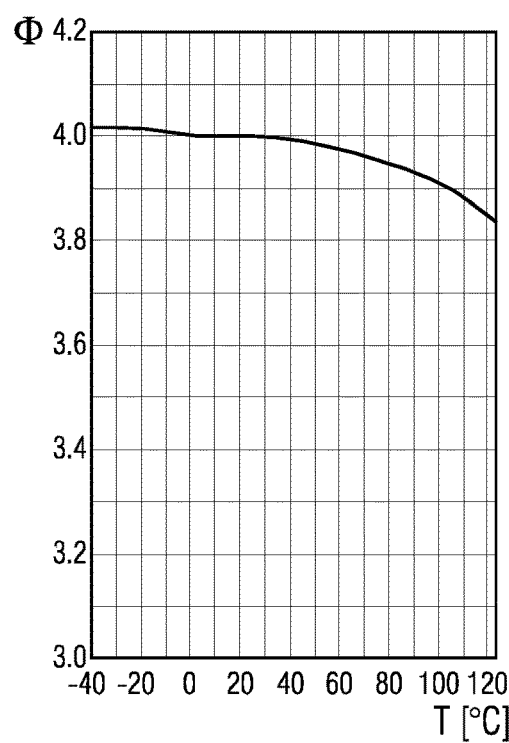

FIG. 3G shows exemplary characterization data D of a light-emitting component 10 in the form of the relative luminous flux Φ as a function of the temperature T of the light-emitting component. The relative luminous flux is approximately constant at a temperature of −40° C. to 50° C. Between a temperature of 50° C. to 120° C., the luminous flux Φ decreases by 15%.

Figure 3H:
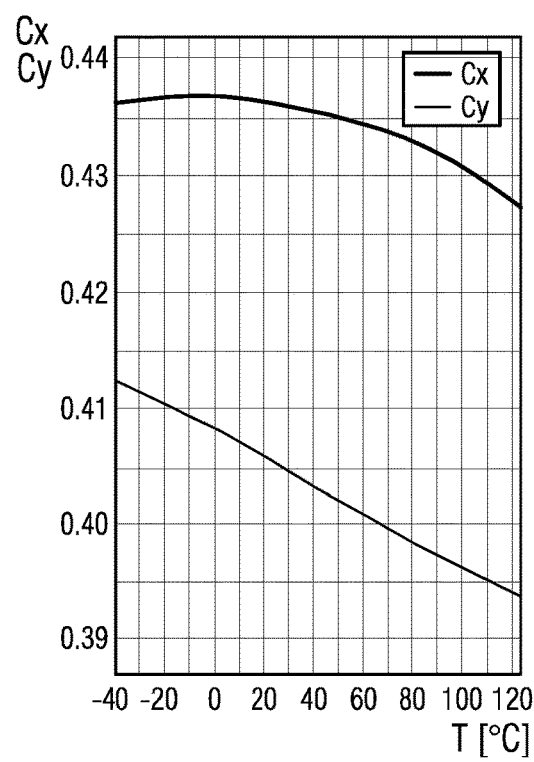

FIG. 3H shows exemplary characterization data D of a light-emitting component 10 in the form of the chromaticity coordinates CX and CY of the emitted light L of a pixel 100 as a function of its operating temperature T at an operating current IS of 100 mA. The chromaticity coordinate CX shows a monotonically increasing behavior between a temperatures of −40° C. to −10° C. From a temperature of −10° C. up to a temperature of 120° C., the chromaticity coordinate CX shows a monotonically decreasing behavior and falls from a value of 4.375 to a value of 4.275. The chromaticity coordinate CY shows approximately linear monotone decreasing behavior over the entire temperature range of −40° C. to 120° C. and falls from a value of 0.4125 to 0.35.

Figure 3I:
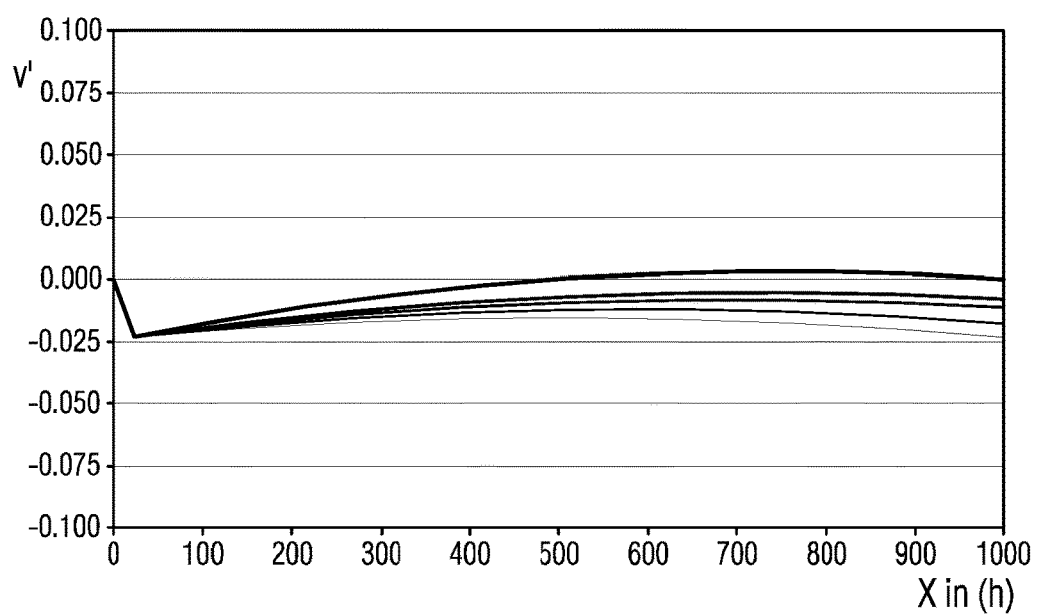

FIG. 3I shows exemplary characterization data D of a light-emitting component 10, in the form of the ordinate V' of the emitted light L in the CIE1976 color space as a function of the operating time X in hours. In this example, the characterized pixels were operated with a direct current of 100 mA at an ambient temperature of 85° C. and a relative moisture of 85%.

Figure 3J:
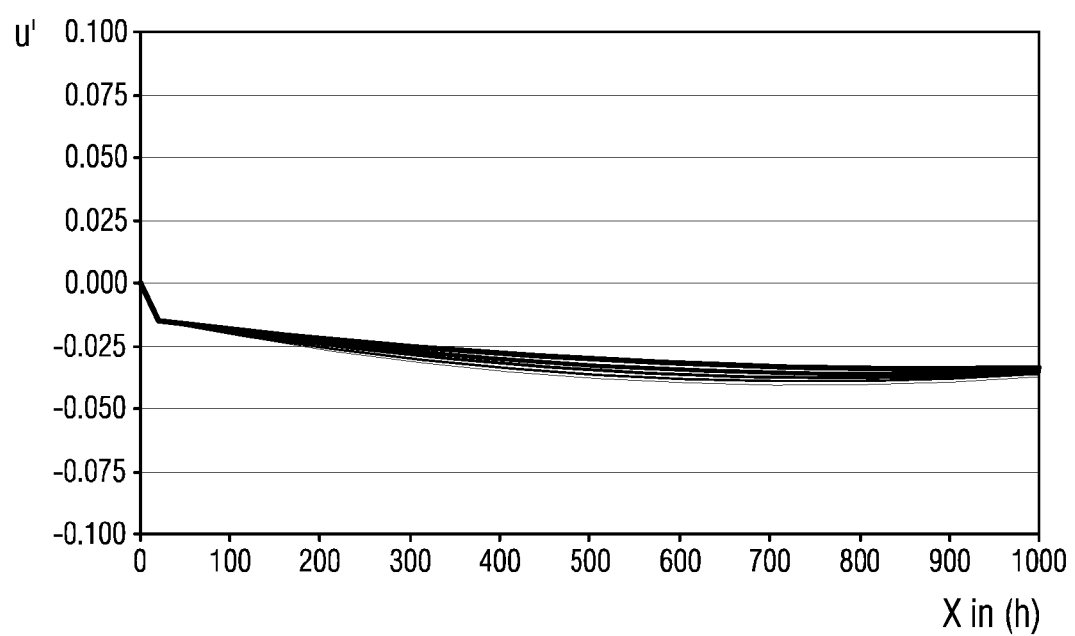

FIG. 3J shows exemplary characterization data D of a light-emitting component 10, in the form of the abscissa U' of the emitted light L in the CIE1976 color space as a function of the operating time X in hours. In this example, the characterized pixels were operated with a direct current of 100 mA at an ambient temperature of 85° C. and a relative moisture of 85%.

Figure 4A:
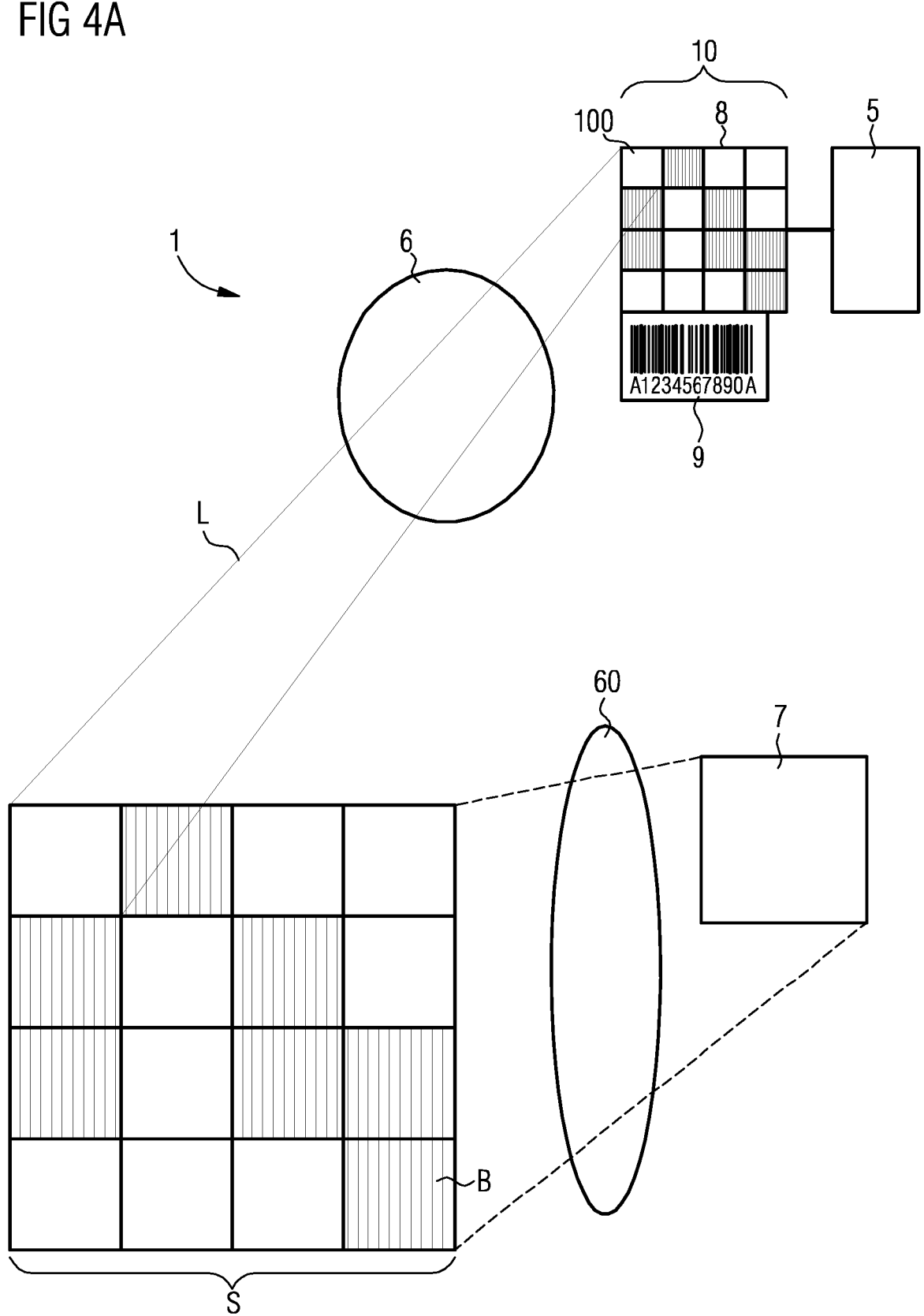
FIGS. 4A, 4B and 4C show a method of operating a lighting device, wherein the light-emitting component comprises a semiconductor chip.

FIG. 4A shows a lighting device 1 according to a first example. The lighting device 1 comprises a light-emitting component 10 with a semiconductor chip 8 with a plurality of pixels 100 that are configured to emit light L. The pixels 100 of the light-emitting component 10 are controlled and operated by a processing device 5. The processing device 5 comprises a processor and a memory in which characterization data D are stored. An optical device 6 that directs the emitted light L into a field of view S, is arranged subordinate to the light-emitting component 10 in the emission direction. By the light L individual zones B of the field of view S are illuminated. In this example, each zone B is assigned exactly one pixel 100 so that each zone B is illuminated with exactly one pixel 100. Alternatively, a zone B may be associated with a plurality of pixels of a same type. The field of view S is imaged by an imaging optics 60 on a sensor 7. The zones B in the field of view S are arranged laterally next to one another and may partially overlap one another.

In the memory of the processing device 5, the characterization data D of the light-emitting component 10 are stored, which is accessed by the processor during operation of the lighting device 1. Alternatively, characterization data D of a representative light-emitting component 10R are stored in the memory as a function of which the light-emitting component 10 is operated by the processor. For example, the characterization data D include characterization data of representative pixels 100R of the light-emitting component 10 or a representative light-emitting component 10R. In particular, the characterization data D were determined before the intended operation of the light-emitting component 10.

The light-emitting component 10 has an identifier 9 in the form of a barcode by which the characterization data D can be unambiguously assigned to the light-emitting component 10. Alternatively, the identifier 9 is a number, a point code or an electronically readable bit pattern that can be unambiguously assigned to the associated characterization data D.

Figure 4B:
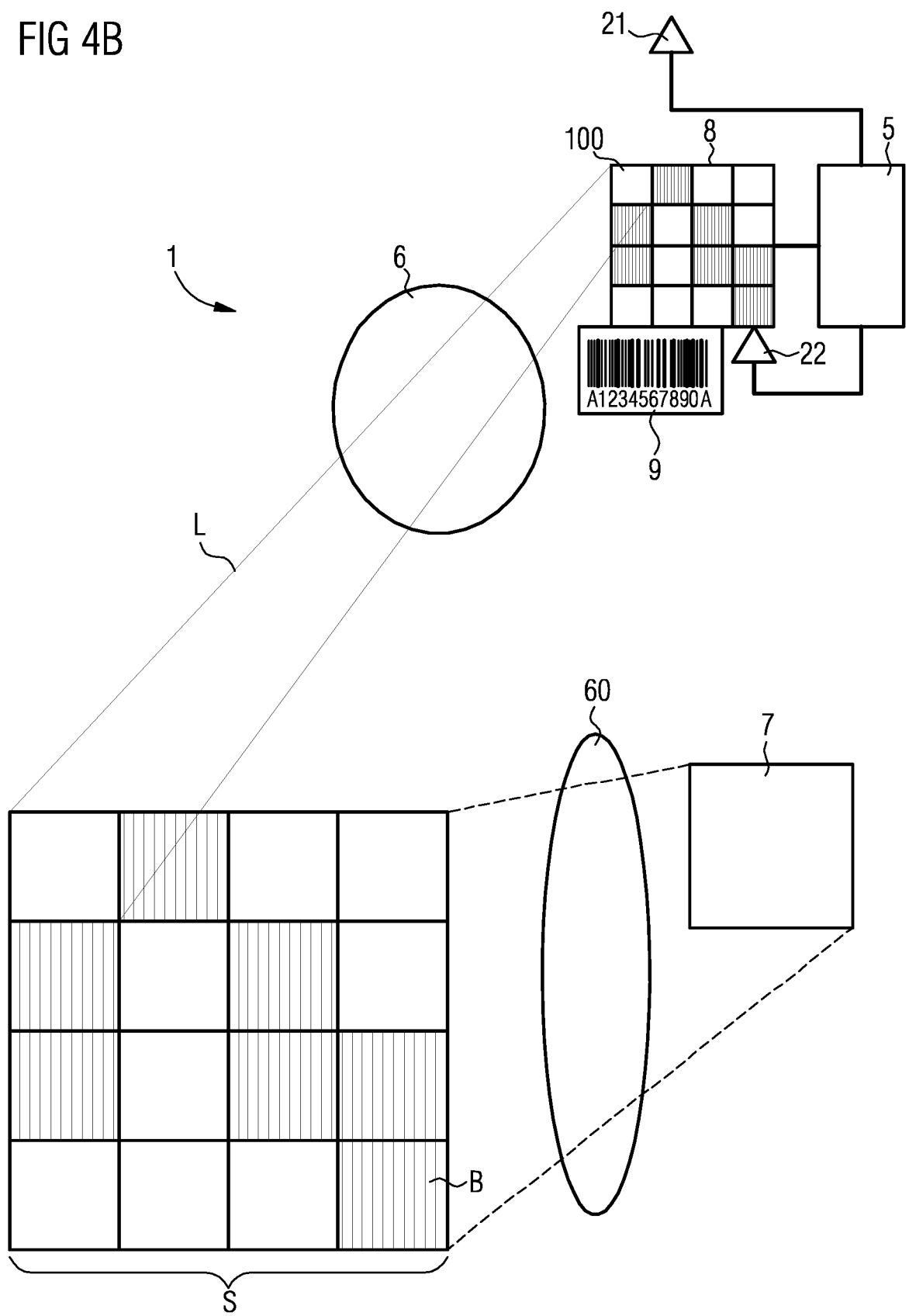

FIG. 4B shows an alternative example of a lighting device 1. The lighting device 1 additionally comprises, compared to the example shown in FIG. 4A, a moisture sensor 21 configured to detect a moisture F of the surroundings. The moisture sensor 21 electrically conductively connects to the processing device 5. During normal operation, the moisture F of the environment is measured by the moisture sensor 21 and the light-emitting component 10 is operated during normal operation as a function of the detected ambient moisture F and the characterization data D.

Furthermore, the lighting device 1 comprises a temperature sensor 22, which is set up to measure the temperature T of the light-emitting component 10. The temperature sensor 22 is electrically conductively connected to the processing device 5. During normal operation, the temperature measurement value is transmitted from the temperature sensor 22 to the processing device 5 and the light-emitting component 10 is operated as a function of the measured temperature T and the characterization data D. Furthermore, the processing device 5 comprises a time measuring device which is set up to measure the operating time X of the individual pixels 100 of the light-emitting component 10. During normal operation, the pixels are operated as a function of the measured operating time X and of the characterization data D.

Figure 4C:
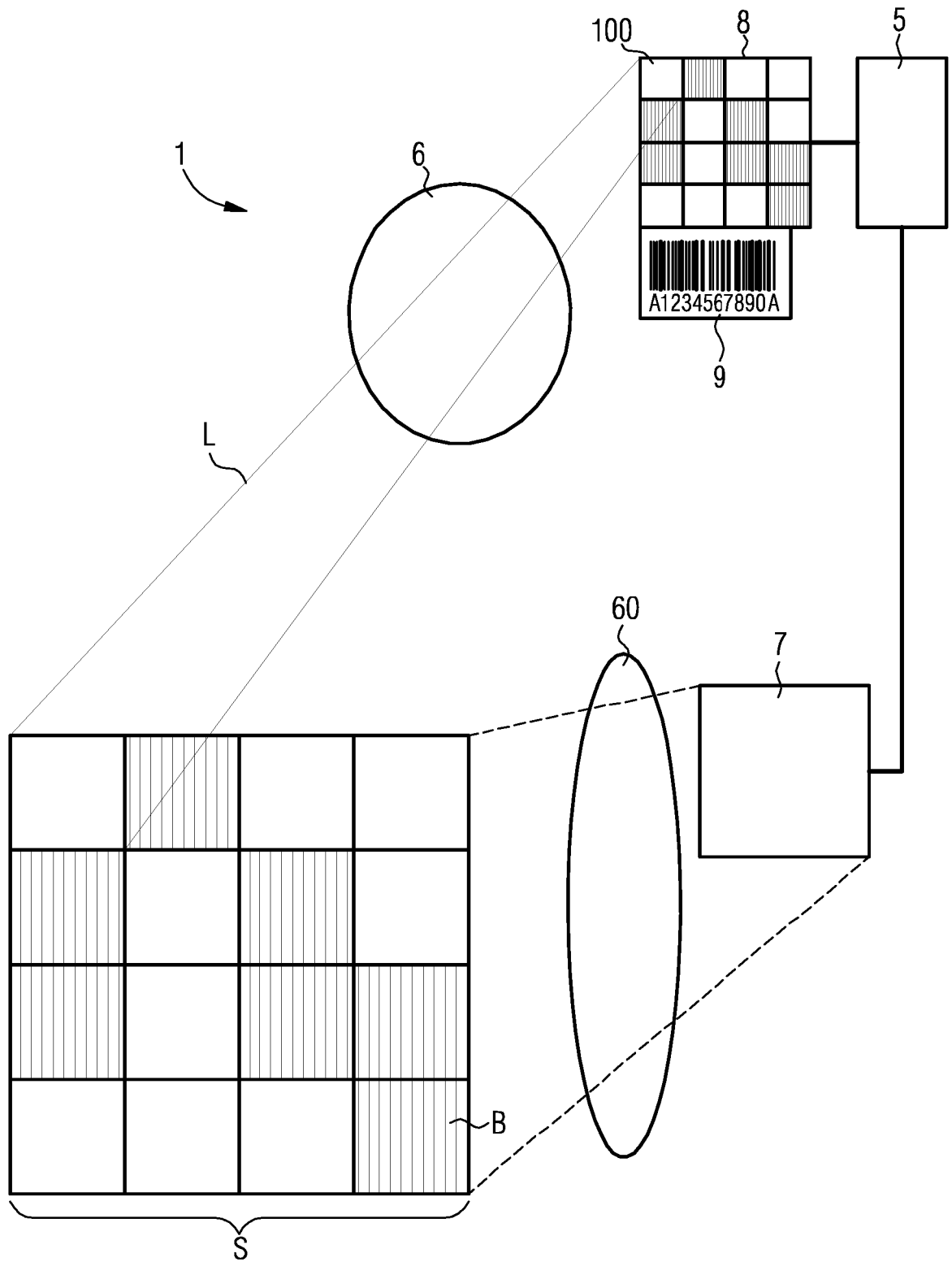

FIG. 4C shows a further example of a lighting device 1, wherein, in contrast to the examples in FIGS. 4A and 4B, the sensor 7 connects in an electrically conductive manner to the processing device 5. In particular, the sensor 7 transmits the field of view S imaged on the sensor 7 simultaneously to the processing device 5 so that a direct feedback takes place. During normal operation, the light-emitting component 10 is operated as a function of the data received via the sensor 7 on the color location and the brightness of individual zones B and the characterization data D stored in the memory 5 to adjust the illumination of the zones B of the field of view S.

During normal operation, a zone B is assigned a set point SO, comprising a brightness set point SH and a color location set point SF. Furthermore, each zone B has an actual value I, comprising an actual brightness value IH and an actual color location IF. During normal operation of the lighting device, the actual value of a zone B is approximated in several method steps to the set point SO of the zone. In particular, the actual value I of each zone B is approximated to the set point SO in a plurality of method steps.

For example, in a method step A, a current actual value I of the zone B is determined by the sensor 7, wherein the field of view S is not illuminated by the component 10. The set points SO of the zones can already be predetermined or can be determined as a function of the actual values I determined in method step A. In a method step B, the light-emitting component 10 is operated as a function of the characterization data D stored in the processing device 5, the determined actual values I and the set points SO. At the same time, a current actual value I of the zone B is determined by the sensor 7 during the operation of the light-emitting component 10. In a method step C, the light-emitting component 10 is operated as a function of the characterization data D, the previously determined actual values I determined in method steps A and B, and the set points SO. In this example, the light-emitting component 10 is operated such that the difference between the current actual value I from method step B of a zone B and the set point SO of the zone B is minimized.

In particular, method step C is carried out several times, where with each repetition of method step C a current actual value I of zone B is determined during the operation of light-emitting component 10. For example, method step C is repeated until the difference between the current actual values I and the set point SO of predetermined zones B, in particular of all zones B, is less than a predetermined value. Furthermore, the number of repetitions of method step C may be limited so that method step C is repeated a maximum of 50 times, in particular a maximum of 10 times.

FIG. 5A shows an alternative example of a lighting device 1. The lighting device 1 comprises a light-emitting component 10 with first-type pixels 110 and second-type pixels 120. The first-type pixels 110 are arranged laterally spaced apart from the second-type pixels 120. The pixels of different types are arranged to emit light L of a different color location. For example, first-type pixels 110 are configured to emit light L of a cold-white color location, and second-type pixels 120 are configured to emit light of a warm white color location. In particular, the pixels of different types 110, 120 are part of different semiconductor chips 8. The first-type pixels 110 and the second-type pixels 120 electrically connect to a processing device 5. During normal operation, the pixels 110 and 120 are individually controlled and operated via the processing device 5. The optical device 6 is configured to direct the light L of a first-type pixel 110 and a second-type pixel 120 onto a common first zone B1 in the field of view S. The first zone B1 is illuminated with the mixed light of a first-type pixel 110 and a second-type pixel 120. Further, a second zone B2 is illuminated only with the emitted light L of a second-type pixel 120 since the first-type pixel 110 associated with the second zone B2 is not operated. The third zone B3 in the field of view S is illuminated only with light L of a first-type pixel 110 since only the first-type pixel 110 assigned to the third zone B3 is operated. A fourth zone B4 is not illuminated by the lighting device 1 in this example since none of the first-type 110 and second-type 120 pixels assigned to the zone B4 are operated. By the operation of the first-type pixels 110 and the second-type pixels 120, both the color location and the intensity of the light with which the zones are illuminated are adjustable.

Figure 5B:
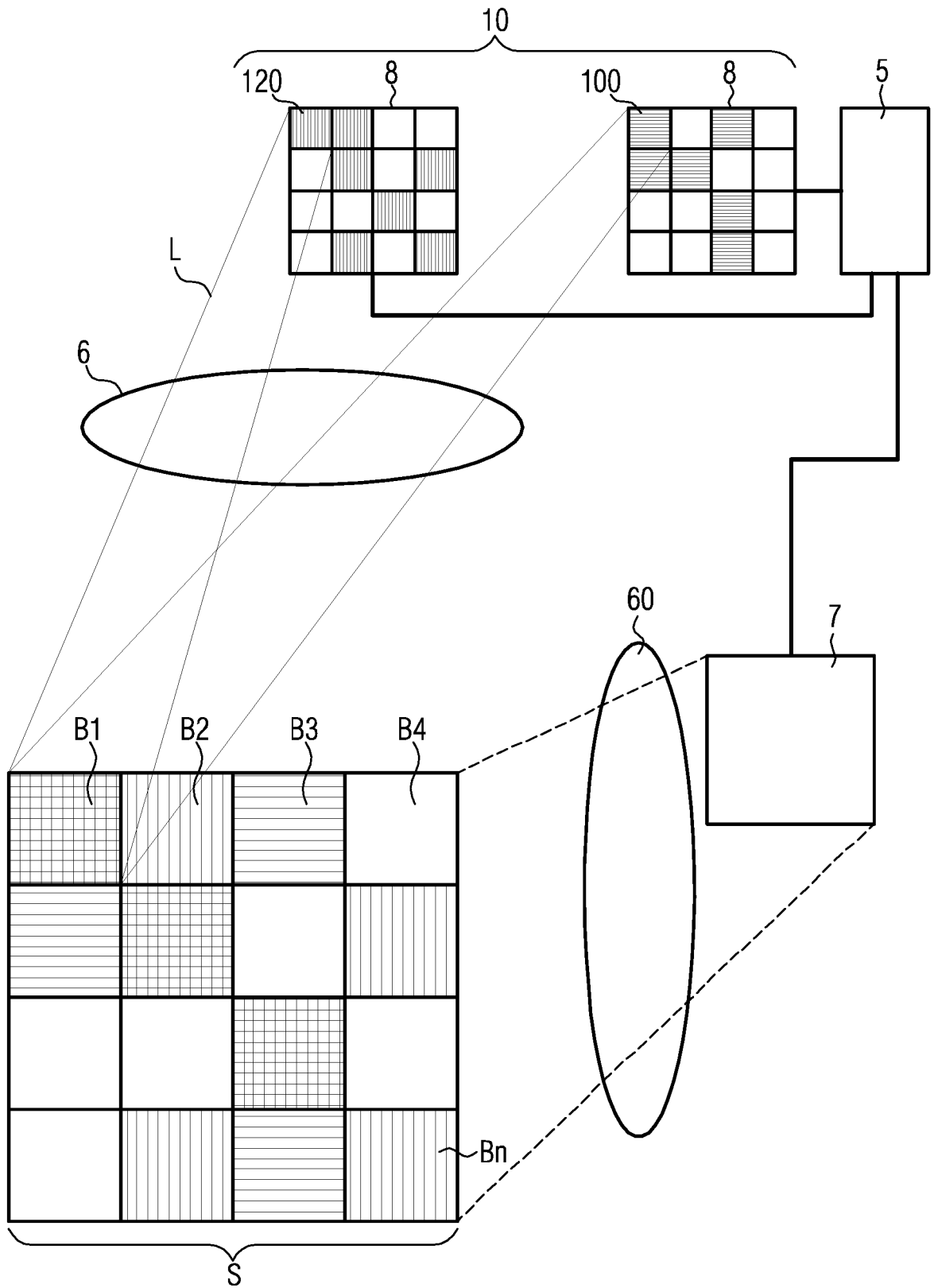

FIG. 5B shows a further example of the lighting device 1, where the sensor 7 electrically conductively connects to the processing device 5. During normal operation, the data recorded by the sensor 7 are transmitted to the processing device 5 so that the processing device 5 operates the light-emitting component 10 as a function of the characterization data D and the data recorded by the sensor 7. In particular, by the light L of the first-type pixel 110 and the second-type pixel 120 associated with each zone B, both the color location and the intensity of the light L with which this zone B is illuminated can be adjusted.

Our methods are not restricted to the examples by the description on the basis of the examples. Rather, this disclosure encompasses any new feature and also any combination of features that in particular comprises any combination of features in the appended claims and any combination of features in the examples, even if the feature or combination itself is not explicitly specified in the claims or examples.

This application claims priority of DE 102017103891.4, the subject matter of which is incorporated herein by reference.

The invention claimed is:

1. A method of operating a lighting device with a light-emitting component, in which
    the light-emitting component comprises a plurality of pixels configured to illuminate a plurality of zones in a field of view,
    the light-emitting component comprises a processing device comprising characterization data of the light-emitting component, and
    the pixels of the light-emitting component are operated as a function of the characterization data, wherein
    to determine characterization data prior to intended operation of the lighting device an intensity and/or a color location of the emitted light of a pixel or of each pixel is measured as a function of an operating current,
    a set point comprising a brightness set point and a color location set point, is assigned to a zone,
    the zone has an actual value comprising an actual brightness value and an actual color location, and
    the actual value of the zone is approximated to the set point in several steps.

2. The method according to claim 1, wherein the light-emitting component comprises first-type pixels and second-type pixels,
    the first-type pixels and the second-type pixels emit light of different wavelength ranges,
    the pixels of different types are arranged on spaced-apart semiconductor chips or are formed by spaced-apart semiconductor chips, and
    at least some of the zones are simultaneously illuminable with the light of a first-type pixel and a second-type pixel.

3. The method according to claim 2, wherein the lighting device comprises an optical device configured to direct the light of a first-type pixel and a second-type pixel to at least some zones.

4. The method according to claim 1, wherein the characterization data are determined at least in part prior to the intended operation of the light-emitting component, and the characterization data are stored in the processing device of this light-emitting component and the pixels are operated as a function of the characterization data.

5. The method according to claim 1, wherein the characterization data of a representative component are determined and the light-emitting component is operated as a function of the characterization data of the representative component.

6. The method according to claim 1, wherein the characterization data of each pixel of the light-emitting component are determined prior to the intended operation of the light-emitting component and the pixels of the light-emitting component are operated as a function of the characterization data.

7. The method according to claim 1, wherein the characterization data of representative pixels of the light-emitting component or the representative component are determined and the pixels of the light-emitting component are operated as a function of these characterization data.

8. The method according to claim 1, wherein
    during operation of the lighting device, a temperature of the light-emitting component is measured,
    the characterization data include a temperature behavior, and
    the light-emitting component is operated as a function of the measured temperature and the characterization data.

9. The method according to claim 1, wherein during operation of the lighting device, a moisture of the surroundings of the light-emitting component is measured, the characterization data include the moisture behavior of the light-emitting component, and the light-emitting component is operated as a function of the measured moisture and the characterization data.

10. The method according to claim 1, wherein during operation of the lighting device an operating time of the light-emitting component is measured, the characterization data include the aging behavior of the light-emitting component, and the component is operated as a function of the measured operating time and the characterization data.

11. The method according to claim 1, wherein the processing device is integrated in the light-emitting component.

12. The method according to claim 1, wherein the characterization data are assigned to a light-emitting component by an identifier.

13. The method according to claim 1, wherein the measured characterization data are deposited in the processing device prior to the intended operation of the lighting device.

14. The method according to claim 1, wherein the lighting device is controlled by a control value, and the brightness and/or the color location of each pixel depend linearly on the control value.

15. The method according to claim 1, wherein

A) a current actual value of the zone is determined without operation of the light-emitting component;

B) the light-emitting component is operated as a function of the characterization data, the determined actual value and the set point of the zone, and at the same time a current actual value of the zone is determined during operation of the light-emitting component; and C) the light-emitting component is operated as a function of the characterization data, the previously determined actual values and the set point so that the difference between the most recent actual value from method step B) and the set point is minimized, and further current actual value is determined; wherein method step C) is carried out several times, each time the method step C) is repeated, a current actual value of the zone is determined during operation of the light-emitting component, and the method step C) is repeated until the difference between the current actual values and the set points is less than a predetermined value.

16. The method according to claim 1, wherein only the differences between the actual values and the set points of some selected zones during operation of the lighting device are minimized.

17. The method according to claim 1, wherein the lighting device is operated as a flashlight.

18. A method of operating a lighting device with a light-emitting component, in which the light-emitting component comprises a plurality of pixels configured to illuminate a plurality of zones in a field of view, the light-emitting component comprises first-type pixels and second-type pixels, the first-type pixels and the second-type pixels emit light of different wavelength ranges, at least some of the zones are illuminable simultaneously with the light of a first-type pixel and a second-type pixel, the light-emitting component comprises a processing device comprising characterization data of the light-emitting component, the pixels of the light-emitting component are operated as a function of the characterization data, wherein to determine characterization data prior to the intended operation of the lighting device an intensity and/or a color location of the emitted light of a pixel or of each pixel is measured as a function of an operating current, a set point comprising a brightness set point and a color location set point, is assigned to a zone, the zone has an actual value comprising an actual brightness value and an actual color location, and the actual value of the zone is approximated to the set point in several steps.

* * * * *